United States Patent
Ishikawa et al.

[11] Patent Number: 5,998,497
[45] Date of Patent: Dec. 7, 1999

[54] LIQUID PHOTOCURABLE RESIN COMPOSITION

[75] Inventors: Miyuki Ishikawa, Tsuchiura; Takashi Ukachi, Ushiku, both of Japan

[73] Assignees: DSM N.V., Heerlen, Netherlands; JSR Corporation, Tokyo, Japan

[21] Appl. No.: 09/087,273

[22] Filed: May 28, 1998

Related U.S. Application Data

[63] Continuation of application No. PCT/NL96/00468, Nov. 27, 1996.

[30] Foreign Application Priority Data

Nov. 28, 1995 [JP] Japan ................................ 9-308802

[51] Int. Cl.$^6$ ............................ C08F 2/46; D02G 3/00; B32B 15/00
[52] U.S. Cl. .......................... 522/96; 522/182; 428/378; 428/38; 427/517; 427/516
[58] Field of Search ................. 522/96, 182; 428/378, 428/380; 525/468; 385/147, 145; 427/517, 516

[56] References Cited

U.S. PATENT DOCUMENTS

| | | | |
|---|---|---|---|
| 4,900,126 | 2/1990 | Jackson et al. | 350/46.23 |
| 4,992,524 | 2/1991 | Coady et al. | 528/49 |
| 5,336,563 | 8/1994 | Cody et al. | 428/375 |
| 5,527,835 | 6/1996 | Shustack | 522/42 |
| 5,595,820 | 1/1997 | Szum et al. | 428/378 |
| 5,639,445 | 6/1997 | Nakayama et al. | 560/209 |
| 5,639,846 | 6/1997 | Shustack | 528/84 |
| 5,774,514 | 4/1998 | Shustack | 522/42 |

FOREIGN PATENT DOCUMENTS

| | | |
|---|---|---|
| 167 199 | 1/1986 | European Pat. Off. |
| 0 262 340 A2 | 6/1988 | European Pat. Off. |
| 0 407 004 A2 | 9/1991 | European Pat. Off. |
| 0 527 266 A1 | 2/1993 | European Pat. Off. |
| 0 833 177 A1 | 8/1996 | European Pat. Off. |
| 09151223A | 6/1997 | Japan |
| 09296017A | 9/1997 | Japan |
| 10315630 A | 12/1998 | Japan |
| 11060658A | 3/1999 | Japan |
| 93 21248 | 10/1993 | WIPO |
| 93/21248 | 10/1993 | WIPO |
| 96 11217 | 4/1996 | WIPO |
| 96/11217 | 4/1996 | WIPO |

*Primary Examiner*—James J. Seidleck
*Assistant Examiner*—Sanza McClendon
*Attorney, Agent, or Firm*—Pillsbury Madison & Sutro LLP

[57] ABSTRACT

A liquid photocurable resin composition having excellent applicability in a high speed drawing condition and high curability, providing a stable coating film which generates little hydrogen gas when used as a coating material for optical fiber. The liquid photocurable resin composition comprises 10–80 wt % of a polymer having an ether bond or an ester bond, and an ethylenically unsaturated group; 5–50 wt % of at least one monomer according to the formula

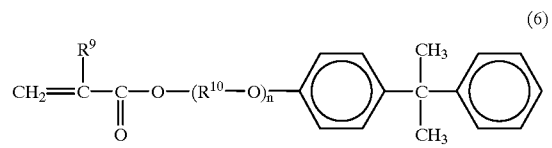

(6)

wherein $R^9$ is a hydrogen atom or a methyl group, $R^{10}$ is an alkylene group having 2–4 carbon atoms, and n denotes an integer from 1–10; 0.1–10% by weight of a photopolymerization initiator; and optionally other compounds comprising one or more ethylenically unsaturated groups.

8 Claims, No Drawings

LIQUID PHOTOCURABLE RESIN COMPOSITION

This is a Continuation of: International Appln. No. PCT/NL96/00468 filed Nov. 27, 1996 which designated the U.S.

BACKGROUND OF THE INVENTION

1. Field of the Invention

The present invention relates to a photocurable resin composition, in particular, to a photocurable composition suitable as a coating material for optical fiber.

2. Description of the Background Art

An optical fiber, especially an optical glass fiber is produced by applying a coating material onto a quartz fiber, because the quartz fiber is fragile and easily damaged.

In the production of optical fiber, a resin coating is provided immediately after drawing a molten quartz fiber. Generally, two coatings are applied: a relatively soft primary, and a harder secondary coating. A coating material with a high cure rate is required so that the glass fiber can be produced at a high production rate. When the cure rate of the coating material is low, the productivity of the optical glass fiber cannot be improved, because the drawing speed must be reduced.

Also, characteristics required for a cured coating material include little physical change during temperature changes over a wide range, and high durability and reliability in a variety of environmental conditions.

Further, coated optical glass fibers are often used in a ribbon assembly. In a ribbon, a plurality of coated optical glass fibers is bonded in one structure by a photocurable matrix material.

SUMMARY OF THE INVENTION

Accordingly, an object of the present invention is to provide a liquid photocurable resin composition suitable as a coating material for optical fiber. The liquid photocurable resin composition has a high coating capability in a high speed coating operation to form a uniform coating film. Also, the cured product from the liquid photocurable resin composition produces little hydrogen gas. Thus, the photocurable resin composition is useful to formulate a relatively soft primary coating, a relatively hard secondary-coating, and a matrix material.

The object of the present invention is achieved in the present invention by a liquid photocurable resin composition comprising:

(A) 10–75% by weight of a urethane oligomer containing an ethylenically unsaturated group
(B) 5–50% by weight of at least one monomer selected from the group containing an ethylenically unsaturated group having the following formula (6),

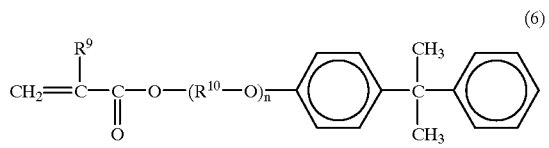

wherein $R^9$ is a hydrogen atom or a methyl group, $R^{10}$ is an alkylene group having 2–4 carbon atoms, and n denotes an integer in the range of 1–10, (C) 0.1–10% by weight of a photopolymerization initiator, and optionally other compounds comprising one or more ethylenically unsaturated groups.

Other objects, features and advantages of the invention will hereinafter become more readily apparent from the following description.

DETAILED DESCRIPTION OF THE INVENTION AND PREFERRED EMBODIMENTS

Illustrating the component (A) for the liquid photocurable resin composition (hereinafter referred to as composition IA), preferably the oligomer comprises at least one structural unit selected from the following groups (1)–(4),

wherein $R^1$ is an alkylene group having 2–6 carbon atoms,

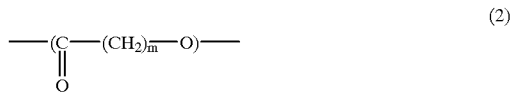

wherein m denotes an integer in the range of 3–10,

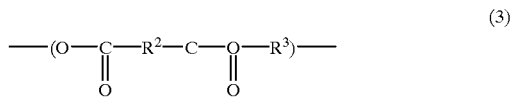

wherein $R^2$ and $R^3$ individually represent a divalent organic group having 2–13 carbon atoms,

wherein n is an integer in the range of 1–50 and $R^4$ is an alkylene group having 2–6 carbon atoms or a divalent organic group of the following formula (5),

and wherein $R^5$, $R^6$, $R^7$, and $R^8$ individually represent a hydrogen atom or an alkyl group having 1–8 carbon atoms, and Q represents a phenyl or hydrogenated phenyl ring. Thus, the urethane oligomer preferably comprises polyether polyester or polycarbonate structures in the backbone.

Examples of specific preferred alkylene groups having 2–6 carbon atoms which are represented by $R^1$ in formula (1) are the structural units shown by the following formulas (7-1) to (7-8).

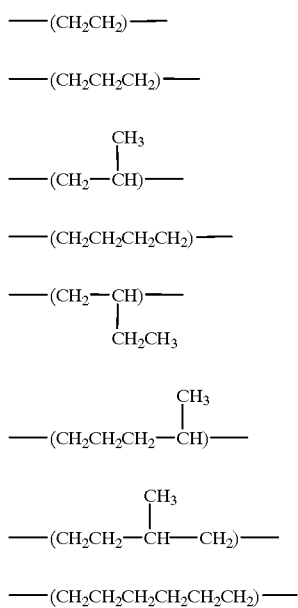

(7-1)
(7-2)
(7-3)
(7-4)
(7-5)
(7-6)
(7-7)
(7-8)

Of these, the structural units (7-1), (7-3), (7-4), (7-5), and (7-7) are particularly preferred.

In the structural unit shown by the formula (2), m is an integer from 3–10 and preferably 5.

In the structural unit shown by the formula (3), as the divalent organic groups represented by $R^2$ or $R^3$ in formula (3) divalent alkylene groups and arylene groups are preferred. Given as specific examples of $R^2$ and $R^3$ are ethylene, propylene, tetramethylene, pentamethylene, hexamethylene, heptamethylene, octamethylene, phenylene, diphenylene, methylenebisphenylene, and the like.

Given as specific preferred alkylene groups having 2–6 carbon atoms which are represented by $R^4$ in formula (4) are the structural units shown by the above formulas (7-1) to (7-8), preferably the structural units of the above formulas (7-1) and (7-3). The following groups (7'-1) to (7'-3) are given as specific examples of the divalent organic group represented by $R^4$ of formula (5).

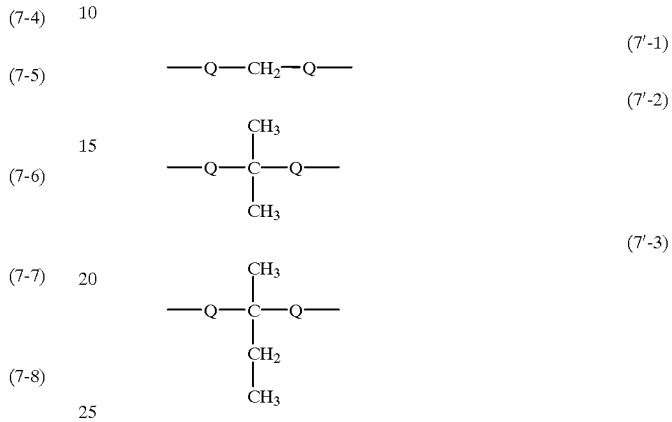

in which Q is a phenyl or hydrogenated phenyl group. Preferably, Q is a phenyl group.

Of these groups, the structural unit (7'-2) is particularly preferred, being bisphenol-A or hydrogenated bisphenol-A.

In the structural units shown by the formula (4), n is an integer from 1–50, and preferably an integer from 1–25.

The following groups (8-1) to (8-5) are given as specific examples of the ethylenically unsaturated groups contained in the component (A).

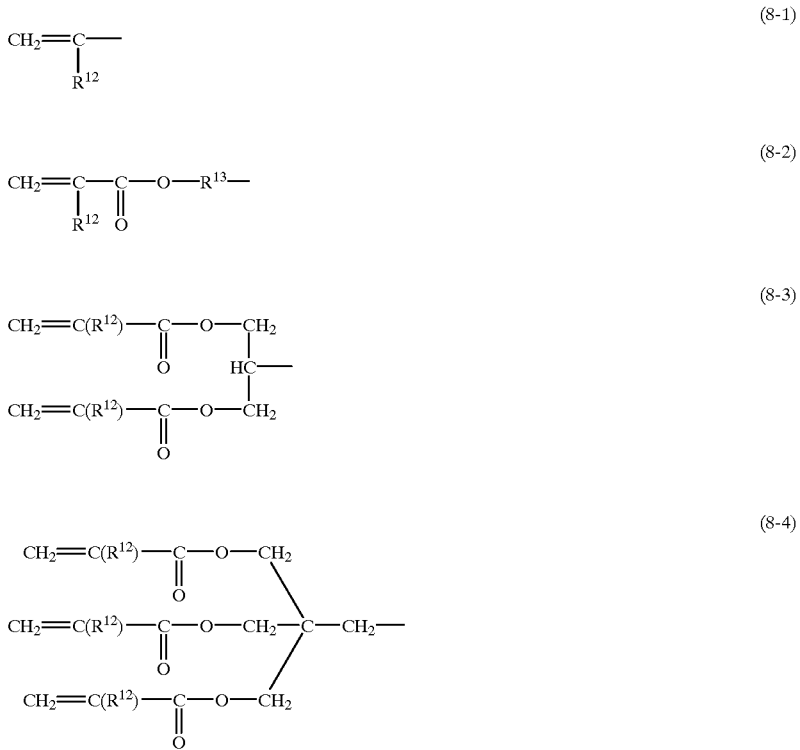

-continued

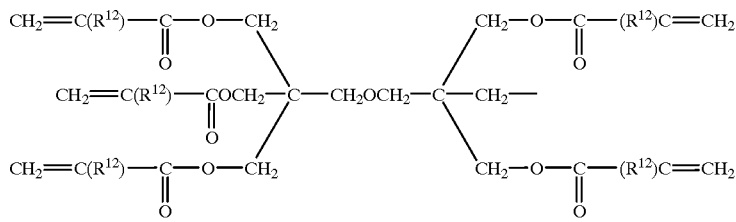

(8-5)

In the formulas (8-1) to (8-5), $R^{12}$ represents a hydrogen atom or a methyl group and $R^{13}$ is an alkylene group having 2–9 carbon atoms, and preferably alkylene group having 2–5 carbon atoms, such as a ethylene group, propylene group, tetramethylene group, or pentamethylene group. Of the above groups (8-1) to (8-5), the group (8-1) containing one ethylenically unsaturated group, the group (8-2) containing one ethylenically unsaturated group, the group (8-3) containing two ethylenically unsaturated groups, and the group (8-4) containing three ethylenically unsaturated groups are preferred, with the groups (8-1) and (8-2) being particularly preferred.

The structural units (1), (2), (3), (4) and the ethylenically unsaturated group which constitutes the component (A) are preferably bonded by at least one bond selected from the group consisting of an urethane bond, urea bond, amide bond, ester bond, and ether bond.

For reducing the temperature dependence of the Young's modulus of elasticity of the cured products made from the composition IA in the temperature range of −40° C. to 60° C. and for appropriately maintaining the viscosity of the composition IA, the number average molecular weight of the component (A) is preferably about 1,000 to about 10,000, and more preferably about 1,500 to about 8,000.

The number of the ethylenically unsaturated groups contained in the component (A) is preferably 1–20, more preferably 1–10, per molecule. Most preferred is a functionality of about 2. Excellent curability of the composition, and favorable durability and flexibility of the cured products are obtained by keeping the proportion of the ethylenically unsaturated group in the above range.

The polymers illustrated above can be used independently or in combination of two or more as the component (A).

The proportion of the component (A) in the composition IA is preferably about 10 to about 75% by weight, and more preferably about 30 to about 70% by weight. Excellent coatability and processability of composition IA, as well as superior flexibility of the cured products, can be achieved by keeping the proportion of the component (A) in this range.

Embodiments of the process for manufacturing the component (a) are now described.

<Process 1>

A process comprising reacting a diol (hereinafter referred to as diol (a)) containing at least one structural unit selected from the above formulas (1), (2), (3), and (4), and optionally a diol other than the diol (a), with a diisocyanate compound to produce a polymer bonded by urethane bonds and having an isocyanate group, and then reacting the isocyanate group of this polymer with a compound having a hydroxyl group and the ethylenically unsaturated group represented by the formulas (8-1) to (8-5) (such a compound is hereinafter referred to as "specific unsaturated compound (a)), thereby introducing the ethylenically unsaturated group via the urethane bond.

<Process 2>

A process comprising reacting the diol (a), and optionally a combination of the diol (a) and a diol compound other than the diol (a) or a diamine, with a diisocyanate compound to produce a polymer bonded by urethane bonds, and optionally by urea bonds, and having an isocyanate group, and then reacting the isocyanate group of this polymer with the specific unsaturated compound (a), thereby introducing the ethylenically unsaturated group via the urethane bond.

<Process 3>

A process comprising reacting a diisocyanate compound with the specific unsaturated compound (a) to produce a polymer bonded by urethane bonds and having an isocyanate group and ethylenically unsaturated groups, and reacting the isocyanate group of this polymer with the diol (a), and optionally a combination of the diol (a) and at least one compound selected from diol compounds other than the diol (a) and diamines, thereby producing urethane bonds, and optionally urea bonds.

<Process 4>

A process comprising reacting the diol (a), and optionally a combination of the diol (a) and at least one compound selected from diol compounds other than the diol (a) and diamines, with a diisocyanate compound to produce a polymer having at least two functional groups selected from a hydroxyl group, primary amino group, and secondary amino group, and then reacting these functional groups with a compound having a carboxyl group, epoxy group, or acid halide group and also having the ethylenically unsaturated group represented by the formulas (8-1) to (8-5), thereby producing ester bonds or amide bonds.

The products produced by these processes 1 to 4 are urethane (metha)acrylate polymers, suitable for use as the component (A). The urethane (meth)acrylate polymers thus produced are suitable for use as a coating material for optical fiber which satisfies the physical characteristics required for the coating material, such as stiffness, toughness, and the like.

Given as specific examples of the diol (a) containing the above structural unit (1) are polyethylene glycol, polypropylene glycol, polytetramethylene glycol, polyheptamethylene glycol, polyhexamethylene glycol, poly-2-methyltetramethylene glycol, ethylene oxide diols added to bisphenol A, butylene oxide diols added to bisphenol A, ethylene oxide diols added to bisphenol F, butylene oxide diols added to bisphenol F, ethylene oxide diols added to hydrogenated bisphenol A, butylene oxide dials added to hydrogenated bisphenol A, ethylene oxide dials added to hydrogenated bisphenol F, butylene oxide dials added to hydrogenated bisphenol F, and polyether dials obtained by ring-opening copolymerization of two or more types of ionic-polymerizable cyclic compounds. Examples of the ionic-polymerizable cyclic compounds used to produce these polyether dials include cyclic ethers such as ethylene oxide, propylene oxide, butene-1-oxide, isobutene oxide, tetrahydrofuran, 2-methyltetrahydrofuran, 3-methyltetrahydrofuran, dioxane, trioxane, tetraoxane, butadiene monoxide, and isoprene monoxide.

It is also possible to use a polyether dial obtained by ring-opening copolymerization of one of the above-mentioned ionic polymerizable cyclic compounds and a cyclic imine such as ethylene imine or the like, a cyclic lactic acid such as β-propiolactone, glycolic acid lactide, or the like; or a cyclic siloxane such as dimethylcyclopolysiloxane; or a polyether diol obtained by ring-opening copolymerization of one of the above-mentioned ionic-polymerizable cyclic compounds and a ionic-polymerizable cyclic compound other than the above-mentioned ionic-polymerizable cyclic compounds, such as 3,3-bischloromethyloxetane, styrene oxide, epichlorohydrine, glycidyl methacrylate, glycidyl acrylate, allyl glycidyl ether, allyl glycidyl cabonate, vinyl oxetane, vinyl tetrahydrofuran, vinyl cyclohexene oxide, cyclohexene oxide, phenyl glycidyl ether, butyl glycidyl ether, and glycidylbenzoate.

Specific examples of combinations of the two or more types of ionic-polymerizable cyclic compounds which can be given include tetrahydrofuran and propylene oxide; tetrahydrofuran and 2-methyltetrahydrofuran; tetrahydrofuran and 3-methyltetrahydrofuran; tetrahydrofuran and ethylene oxide; propylene oxide and ethylene oxide; and ethylene oxide and butene oxide. The ring-opening copolymers of these ionic-polymerizable cyclic compounds may be bonded at random.

Examples of these polyols which are commercially available include PTMG1000 and PTMG2000 (Mitsubishi Chemical Co., Ltd.); PPG1000, PPG2000, EXCENOL 2020, EXCENOL 1020 (Asahi Oline); PEG1000, UNISAFE DC1100, DA400, UNISAFE DC1800 (Nippon Oil and Fats Co., Ltd.); PPTG2000, PPTG1000, PTG400, PTGL2000 (Hodogaya Chemical Co., Ltd.); and PBG2000A, PBG2000B (Daiichi Kogyo Seiyaku Co., Ltd.).

Further, given as examples of the diol having the structural unit of formula (2) are polycaprolactone diols obtained by the reaction of E-caprolactone and a divalent diol such as ethylene glycol, tetramethylene glycol, 1,6-hexane glycol, neopentylene glycol, or 1,4-butane diol.

As examples of the diol having the structural unit of formula (3), polyester diols obtained by the reaction of a polyhydric alcohol, such as ethylene glycol, propylene glycol, tetramethylene glycol, 1,6-hexane diol, neopentylene glycol, or 1,4-cyclohexane-dimethanol, and a polybasic acid, such as phthalic acid, isophthalic acid, tetraphthalic acid, maleic acid, fumaric acid, adipic acid, or sebacic acid, can be given. Commercially available products which can be used include, for example, Nipporane 4060 (Nihon Polyurethane).

As examples of the diol having the structural unit of formula (4), polycarbonate diols and commercially available products, such as DN-980, DN-981, DN-982, DN-983, Nipporane N-982 (Nihon Polyurethane), and PC-8000(PPG of the US) can be given.

The following compounds can be given as the diol compounds other than the diol (a) used in the Processes 1–4: 1,4-cyclohexanedimethanol, dimethylol compounds of dicyclopentadiene, tricyclodecanedimethanol, β-methyl-δ-valerolactone, polybutadiene with terminal hydroxyl groups, hydrogenated polybutadiene with terminal hydroxyl groups, castor oil-denatured polyol, polydimethylsiloxane with terminal diols, and polydimethylsiloxane carbitol-denatured polyol.

In addition, as examples of the diamine used in the processes 2–4 above, ethylene diamine, tetramethylene diamine, hexamethylene diamine, paraphenylene diamine, 4-4'-diaminodiphenylmethane, diamines with hetero atoms, and polyether diamines, can be given.

Included in the diisocyanate used in the Processes 1–4 are, for example, 2,4-toluene diisocyanate, 2,6-toluene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, methylene bis(4-cyclohexylisocyanate), hydrogenated diphenyl-methane diisocyanate, 2,2,4-trimethylhexamethylene diisocyanate, 2,5-bis(isocyanatemethyl)-bicyclo[2.2.1]heptane, 2,6-bis(isocyanatemethyl)-bicyclo[2.2.1]heptane, bis(2-isocyanate-ethyl) fumarate, 6-isopropyl-1,3-phenyl diisocyanate, 4-diphenylpropane diisocyanate, and lysine diisocyanate.

Furthermore, (meth)acrylate compounds having a hydroxyl group can be included in the specific unsaturated compound (A). Given as examples of such (meth)acrylate compounds having a hydroxyl group are 2-hydroxylethyl (meth)acrylate, 2-hydroxylpropyl (meth)acrylate, 2-hydroxyloctyl (meth)acrylate, pentaerythritol tri(meth)acrylate, glycerine di(meth)acrylate, dipentaerythritolmonohydroxy penta(meth)acrylate, 1,4-hydroxylcyclohexyl (meth)acrylate, 1,6-hexanediol mono(meth)acrylate, neopentylglycol mono(meth)acrylate, trimethylolpropane di(meth)acrylate, trimethylolethane di(meth)acrylate, (meth)acrylates represented by the following formulas (9-1) or (9-2).

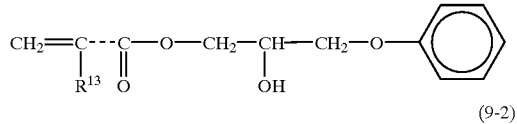

(9-1)

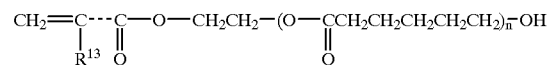

(9-2)

wherein $R^{13}$ is a hydrogen atom or a methyl group and n is an integer from 1 to 5.

The component (B) which is part of the composition IA of the present invention is a monomer having the ethylenically unsaturated bond represented by the above formula (6).

In the formula (6), $R^9$ is a hydrogen atom or a methyl group, $R^{10}$ is a alkylene group having 2–4 carbon atoms, and n is an integer from 1 to 10. Given as the alkylene group having 2–4 carbon atoms are ethylene, triethylene, propylene, tetramethylene, and the like. Such compounds are for example described in EP-A-???

Given as examples of the monomer shown by the formula (6) are monomers represented by the following formulas.

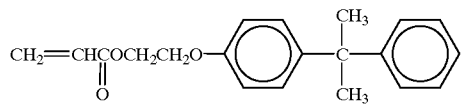

-continued

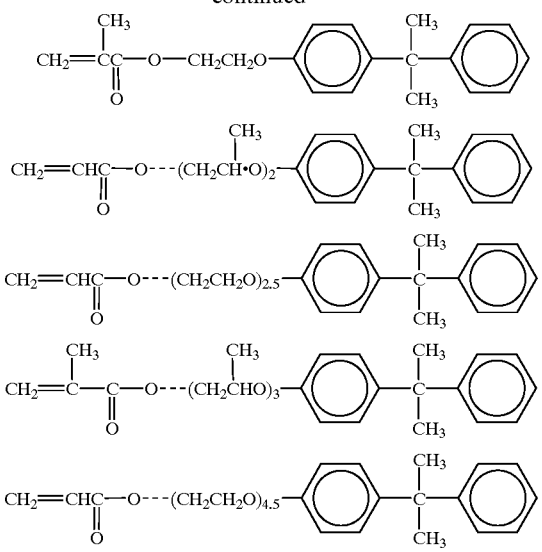

These monomers can be used independently or in combinations of two or more of them.

The component (B) is incorporated in the composition IA in an amount of about 5 to about 50% by weight, and preferably about 7 to about 40% by weight. The total amount of the components (A) and (B) incorporated in the composition IA is preferably more than 30% by weight, and more preferably more than 40% by weight.

Given as examples of photopolymerization initiators which can be used as the component (C) in the composition IA of the present invention are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy -2-methylpropane-1-one, 2-hydroxy-2-methyl-1-phenylpropane-1-one, thioxanthone, diethylthioxanthone, 2-isopropyl-thioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoil)-2,4,4-trimethylpentylphosphi ne oxide. Further, given as examples of commercially available photopolymerization initiators are Irgacure 184, 369, 651, 500, 907, CGI1700, CGI1750, CGI1850, CG24-61 (Ciba Geigy), Lucirin LR8728 (BASF), Darocur 1116, 1173 (Ciba Geigy), and Uvecryl P36 (UCB).

These components may be used independently or in combinations of two or more. The component (C) may be incorporated in the composition IA in the amount of 0.1–10% by weight, more preferably 1–5% by weight. A photo-sensitizer can be added as required in the photopolymerization initiator.

Given as examples of the photo-sensitizer are triethylamine, diethylamine, N-methyldiethanolamine, ethanolamine, 4-dimethylaminobenzoate, methyl 4-dimethylaminobenzoate, isothiamine 4-dimethylaminobenzoate, and commercially available products such as Uvecryl P102, P103, P104, and P105 (manufactured by UCB).

Further, in addition to the above components, monofunctional compounds (hereinafter referred to as "monofunctional compound (D)") having one ethylenically unsaturated group in the molecule other than the above-mentioned compounds used as the component (B), and or polyfunctional compounds (hereinafter referred to as "polyfunctional compound (E)") having two or more ethylenically unsaturated groups in the molecule are preferably incorporated in the composition IA.

Given as examples of the monofunctional compound (D) are 2-hydroxylethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, octadecyl (meth)acrylate, lauryl (meth)acrylate, stearyl (meth)acrylate, tetrahydrofurfuryl (meth)acrylate, butoxyethyl (meth)acrylate, ethoxydiethylene glycol (meth) acrylate, benzyl (meth)acrylate, cyclohexyl (meth)acrylate, phenoxyethyl (meth)acrylate, polyethylene glycol mono (meth)acrylate, polypropylene glycol mono(meth)acrylate, methoxyethylene glycol (meth)acrylate, ethoxyethyl (meth) acrylate, methoxypolyethylene glycol (meth)acrylate, dicyclopentadienyl (meth)acrylate, dicyclopentanyl (meth) acrylate, dicyclopentenyl (meth)acrylate, tricyclodecanyl (meth)acrylate, isobornyl (meth)acrylate, bornyl (meth) acrylate, diacetone (meth)acrylamide, isobutoxymethyl (meth)acrylamide, N-vinylpyrrolidone, N-vinylcaprolactam, N-vinylformaldehyde, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N'-dimethylaminopropyl (meth) acrylamide, (meth)acryloylmorpholine; vinyl ethers such as hydroxybutyl vinyl ether, lauryl vinyl ether, cetyl vinyl ether, and 2-ethylhexyl vinyl ether; maleic esters; fumaric esters; and compounds represented by the following formulas (10) to (12).

(10)

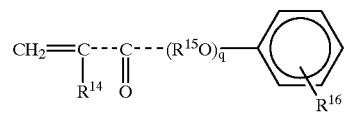

wherein $R^{14}$ is a hydrogen atom or a methyl group; $R^{15}$ is an alkylene group containing 2 to 6, preferably 2 to 4 carbon atoms; $R^{16}$ is a hydrogen atom or an alkyl group containing 1 to 12, preferably 1 to 9, carbon atoms; and q is an integer from 0 to 12, and preferably from 1 to 8.

(11)

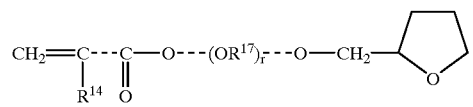

wherein $R^{14}$ is the same as defined above; $R^{17}$ is an alkylene group containing 2 to 8, preferably 2 to 5, carbon atoms; and r is an integer from 1 to 8, and preferably from 1 to 4.

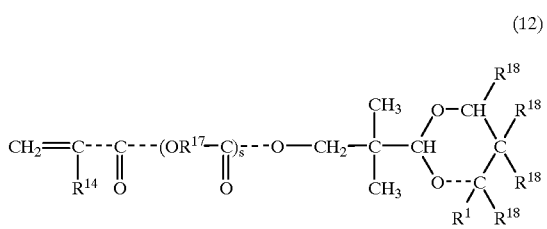

(12)

wherein $R^{14}$ and $R^{17}$ are the same as defined above; s is an integer from 1 to 15; $R^{18}$ is a hydrogen atom or a ethyl group.

Commercially available monofunctional compounds include ARONIX M102, M111, M113, M114, M117 (Toagosei Co.), KAYARAD TC110S, R629, R644 (Nippon Kayaku Co., Ltd.), and Viscoat 3700 (Osaka Organic Chemical Industry, Ltd.).

Examples of the polyfunctional compound (E) include: trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, and epoxy (meth)acrylate which is a (meth)acrylate adduct to bisphenol A of diglycidyl ether.

Given as commercially available polyfunctional compounds are YUPIMER-UV, SA1002, SA2007 (Mitsubishi Chemical Co., Ltd.), Viscoat 700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), and ARONIX M-210, M-215, M-315, M-325 (Toagosei Co.).

At least one compound selected from those compounds (D) and (E) is preferably incorporated in the composition IA in the amount of 1-40% by weight. The total amount of compound (D) and (E) in general will be less then 70% by weight, preferably less than 60% by weight.

Besides the above components, the liquid curable resin composition of the present invention may be formulated as other ingredients by other curable oligomers or polymers, such as epoxy resin, polyamide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine oligomers, silicon oligomers, and polysulfide oligomers.

In addition, reactive oligomers prepared by copolymerizing styrene compounds, (meth)acryl compounds, (meth)acryl compounds with an epoxy group, and the like, and introducing an acryloyl group into the copolymer (e.g. AP-2150, B-3000 to B-3006 (Shin-Nakamura Chemical Co.)) may be incorporated in the composition.

Besides these, various additives may be added as required, such as antioxidants, UV absorbers, photostabilizers, silane coupling agents, aging preventives, thermal polymerization inhibitors, leveling agents, coloring matters, surface active agents, preservatives, plasticizers, lubricants, solvents, fillers, wettability improvers, and coated surface improvers. Given as commercially available examples of an antioxidant are Irganox 1010, 1035, 1076, 1222 (Ciba Geigy), and the like. As UV absorbers, Tinuvin P234, P320, P326, P327, P328, P213 (Ciba Geigy), Sumisorb 110, 130, 140, 220, 250, 300, 320, 340, 350, 400 (Sumitomo Chemical Industries Co., Ltd.), and the like are given as examples. Commercially available photostabilizers which can be added include Tinuvin 292, 144, 622LD (Ciba Geigy), and Sanol LS770, LS765, LS292, LS2626, LS1114, LS744 (Sankyo Co.). Examples of silane coupling agents which can be given are γ-aminopropyltriethoxysilane, γ-mercaptopropyltrimethoxysilane, γ-methacryloxypropyltrimethoxysilane, and commercial products such as SH6062, SZ6030 (Toray-Dow Corning Silicone Co.) and KBE903, KBM803 (Shin-etsu Silicone Co.). Commercially available aging preventives include Antigene W, S, P, 3C, 6C, RD-G, FR, AW (Sumitomo Chemical Co.), and the like.

The present invention will be hereinafter described in more detail by way of examples which are given for illustration of the present invention and shall not be construed as limiting the present invention.

EXAMPLES

Synthetic Example 1

<Synthesis of urethane acrylate polymer and preparation of composition I>

18.2 g of tolylene diisocyanate, 0.055 g of dibutyltin dilaurate, 0.01 g of 2,6-di-tert-butyl-p-cresol, and 12.7 g of tricyclodecanedimethanol diacrylate (Mitsubishi Chemical Co.) were placed in a reaction vessel equipped with a stirrer, and cooled to below 15° C. 17.0 g of hydroxyethyl acrylate was added dropwise to the mixture while stirring and controlling the temperature below 30° C. After the addition was completed, the mixture was reacted at 30° C. for 1 hour. The resulting reaction product was reacted with 3.0 g of tricyclodecanedimethanol (Mitsubishi Chemical Co.) and 30.7 g of a ring-opening copolymer of tetrahydrofuran (number average molecular weight: 2,000) and 3-methyl-tetrahydrofuran at 20–55° C. while stirring. The reaction was terminated when the residual amount of isocyanate was reduced to 0.1 wt % or less, to obtain a reaction solution containing a urethane acrylate (number average molecular weight: 1,670). To the reaction solution were added 8.1 g of N-vinylpyrrolidone, 9.9 g of the compound shown by the following formula, 3.0 g of Irgacure 184 (Ciba Geigy), and 0.3 g of Irganox 1035 (Ciba Geigy).

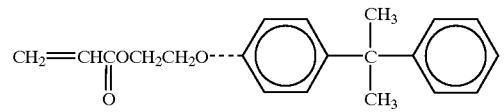

The mixed solution was stirred while controlling the solution temperature at 50–60° C. until the mixed solution changed to a homogeneous and transparent solution, to obtain the composition I containing 67 wt % of a polymer which was the component (A), 9.6 wt % of a monomer which was the component (B), and 2.9 wt % of a photopolymerization initiator which was the component (C).

Synthetic Example 2

<Synthesis of urethane acrylate polymer and preparation of composition II>

13.3 g of tolylene diisocyanate, 0.04 g of dibutyltin dilaurate, 0.012 g of 2,6-di-tert-butyl-p-cresol, and 22.9 g of the compound shown by the following formula were placed in a reaction vessel equipped with a stirrer, and cooled to below 15° C.

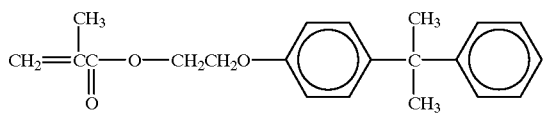

7.0 g of hydroxylethyl acrylate was added dropwise to the mixture while stirring and controlling the temperature below 30° C. After the addition was completed, the mixture was reacted at 30° C. for 1 hour. The resulting reaction product was reacted with 10.0 g of PLACCEL 205H (polycaprolactone-diol: Daicel Chemical Industries Ltd.), 5.1 g of polyethylene oxide addtion diol to bisphenol A (number average molecular weight: 400), and 14.5 g of a ring-opening copolymer of 3-methyltetrahydrofuran and tetrahydrofuran (molecular weight: 1,000) at 50–60° C. The reaction was terminated when the residual amount of isocyanate was reduced to 0.1 wt % or less, to obtain a reaction solution containing a urethane acrylate polymer (number average molecular weight: 1,650). To the reaction solution were added 15.9 g of vinylcaprolactam, 8.0 g of SA1002 (a polyfunctional and reactive diluent produced by Mitsubishi Chemical Co.), 3.0 g of lauryl acrylate (Osaka Organic Chemical Industry Ltd.), 2.5 g of Lucirin (BASF), 0.5 g of Irgacure 907 (Ciba Geigy), and 0.3 g of Irganox 1035. The mixed solution was stirred while controlling the solution temperature at 50–60° C. until the mixed solution changed to a homogeneous and transparent solution, to obtain the composition II containing 48.6 wt % of a polymer which was the component (A), 22.3 wt % of a monomer which was the component (B), and 2.9 wt % of a photo-polymerization initiator which was the component (C).

Synthetic Example 3

<Synthesis of urethane acrylate polymer and preparation of composition III>

15.9 g of isophorone diisocyanate, 0.046 g of dibutyltin dilaurate, 0.014 g of 2,6-di-tert-butyl-p-cresol, 12.4 g of tricyclodecanedimethanol diacrylate were placed in a reaction vessel equipped with a stirrer, and cooled to below 15° C. 11.0 g of hydroxyethyl acrylate was added dropwise to the mixture while stirring and controlling the temperature below 30° C. After the addition was completed, the mixture was reacted at 30° C. for 1 hour. The resulting reaction product was reacted with 4.5 g of polyethylene oxide added diol to bisphenol A (number average molecular weight: 400) at 20–50° C. for 1 hour and then with 26.4 g of polytetramethylene glycol (number average molecular weight: 2,000) at 50–60° C. The reaction was terminated when the residual amount of isocyanate was reduced to 0.1 wt % or less, to obtain a reaction solution containing a urethane acrylate polymer (number average molecular weight: 1,960). To the reaction solution were added 16.9 g of the compound represented by the following formula, 12.5 g of Viscoat 700 (a diacrylate of an ethylene oxide addition diol of bisphenol-A produced by Osaka Organic Chemical Industry, Ltd.), 1.5 g of Irgacure 184, 1.5 g of Lucirin. 1.0 g of Irgacure 907, 0.3 g of Irganox 1035, 0.2 g of Tinuvin 292 (Ciba Geigy), and 0.1 g of SH190 (Toray-Dow Corning Silicone Co.).

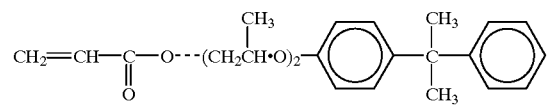

The mixed solution was stirred while controlling the solution temperature at 50–60° C. until the mixed solution changed to a homogeneous and transparent solution, to obtain the composition III containing 55.4 wt % of a polymer which was the component (A), 16.2 wt % of a monomer which was the component (B), and 3.8 wt % of a photo-polymerization initiator which was the component (C).

Synthetic Example 4

<Synthesis of urethane acrylate polymer and preparation of composition IV>

3.3 g of tolylene diisocyanate, 51.0 g of a ring-opening copolymer of ethylene oxide (a number average molecular weight: 4,000) and butene oxide, 8.6 g of the compound shown by the following formula, and 0.013 g of 2,6-di-tert-butyl-p-cresol were placed in a reaction vessel equipped with a stirrer, and cooled with ice to below bove 10° C.

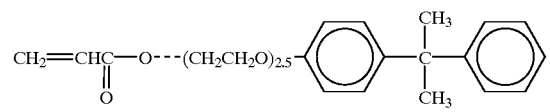

When the solution temperature was below 10° C., 0.045 g of dibutyltin dilaurate was added to the solution. The mixed solution was stirred for 2 hours, controlling the solution temperature at 20–30° C. Then, 0.3 g of SH6062 (Toray-Dow Corning Silicone Co.) was added to the solution and stirred at 30–40° C. for 1 hour. After the stirring was completed, 1.3 g of hydroxyethyl acrylate was added to the solution and mixed with the solution while stirring for 4 hours at 50–60° C. The reaction was terminated when the residual amount of isocyanate was reduced to 0.1 wt % or less, to obtain a reaction solution containing a urethane acrylate polymer (number average molecular weight: 8,750). To the reaction solution were added 3.0 g of N-vinylcaprolactam, 16.1 g of M114 (a monofunctional and reactive diluent produced by Toagosei Co.), 13.1 g of lauryl acrylate, 3.0 g of Irgacure 184, 0.8 g of Irganox 1035, 0.3 g of SEESORB 103 (Sipro Chemical Co.), and 0.1 g of diethylamine. The mixed solution was stirred at 50–60° C. until the mixed solution changed to a homogeneous and transparent solution, to obtain the composition IV containing 55.4 wt % of a polymer which was the component (A), 8.5 wt % of a monomer which was the component (B), and 3.0 wt % of a photo-polymerization initiator which was the component (C).

Synthetic Example 5

<Synthesis of urethane acrylate polymer and preparation of composition V>

6.7 g of tolylene diisocyanate, 0.049 g of dibutyltin dilaurate, 0.015 g of 2,6-di-tert-butyl-p-cresol, 0.005 g of phenothiazine, and 16.5 g of the compound shown by the following formula were placed in a reaction vessel equipped with a stirrer, and cooled to below 15° C.

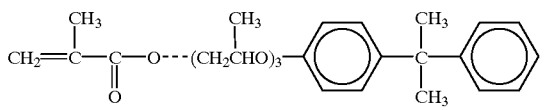

To the mixture was added dropwise 3.0 g of hydroxyethyl acrylate while stirring and controlling the solution temperature below 30° C. After the addition was completed, the mixture was reacted at 30° C. for 1 hour. To the reaction mixture was added 51.1 g of a ring-opening copolymer of 3-methyltetrahydrofuran and tetrahydrofuran (number average molecular weight: 2,000), followed by reacting at 20–55° C. while stirring. The reaction was terminated when the residual amount of isocyanate was reduced to 0.1 wt % or less, to obtain a reaction solution containing a urethane acrylate polymer (number average molecular weight: 4,700). To the reaction solution were added 11.0 of isobornyl acrylate, 4.9 g of vinylcaprolactam, 5.7 g of lauryl acrylate, 0.2 g of Irganox 1035, and 2.0 g of Lucirin. The mixture was stirred at 40–50° C. for about 30 minutes until the mixture changed to a homogeneous and transparent solution. Then, the solution was stirred at 30–40° C. for further 30 minutes. 0.1 g of diethylamine was added to the solution and the mixed solution was stirred for 30 minutes. 0.8 g of SH6062 was then added to the mixed solution, followed by stirring at 40–50° C. until the mixture changed to a homogeneous solution, to obtain the composition V containing 60.1 wt % of a polymer which was the component (A), 16.3 wt % of a monomer which was the component (B), and 1.98 wt % of a photo-polymerization initiator which was the component (C).

Synthetic Example 6

<Synthesis of urethane acrylate polymer and preparation of composition VI>

8.2 g of isophorone diisocyanate, 49.0 g of a ring-opening copolymer of butene oxide and ethylene oxide (a number average molecular weight: 2,000), 0.015 g of 2,6-di-tert-butyl-p-cresol, and 25.4 g of the compound shown by the formula described below were placed in a reaction vessel equipped with a stirrer, and cooled with ice to below 10° C.

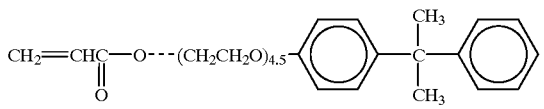

To the mixture was added 0.049 g of dibutyltin dilaurate, followed by stirring for 2 hours while maitaining the solution temperature at 20–30° C. After 0.6 g of SH6062 was added to the mixture, stirring was continued at 30–40° C. for one hour. The resulting mixture was blended with 3.0 g of hydroxyethyl acrylate, followed by stirring for 4 hours while controlling the solution temperature at 50–60° C. The reaction was terminated when the residual amount of isocyanate was reduced to 0.1 wt % or less, to obtain a reaction solution containing a urethane acrylate polymer (number average molecular weight: 3,870). To the reaction solution were added 3.0 g of N-vinylcaprolactam, 9.6 g of the compound shown by the formula described above, 1.0 g of Irganox 1035, 1.5 g of Irgacure 184, 0.5 g of Lucirin, and 0.1 g of diethylamine. The mixed solution was stirred at 40–50° C. to obtain the composition VI as a homogeneous and transparent solution. The composition VI contained 59.6 wt % of a polymer which was the component (A), 34.3 wt % of a monomer which was the component (B), and 1.96 wt % of a photo-polymerization initiator which was the component (C).

Synthetic Example 7

<Synthesis of urethane acrylate polymer and preparation of composition VII>

18.2 g of tolylene diisocyanate, 0.055 g of dibutyltin dilaurate, 0.017 g of 2,6-di-tert-butyl-p-cresol, and 12.7 g of tricyclodecanedimethanol diacrylate (Mitsubishi Chemical Co.) were placed in a reaction vessel equipped with a stirrer, and cooled to below 15° C. To the mixture was added dropwise 17.0 g of hydroxyethyl acrylate while stirring and controlling the solution temperature below 30° C. After the addition was completed, the mixture was reacted at 30° C. for 1 hour. To the reaction mixture was added 3.0 g of tricyclodecanedimethanol (Mitsubishi Chemical Co.) and 30.7 g of a ring-opening copolymer of 3-methyltetrahydrofuran and tetrahydrofuran (number average molecular weight: 2,000), followed by reacting at 20–55° C. while stirring. The reaction was terminated when the residual amount of isocyanate was reduced to 0.1 wt % or less, to obtain a reaction solution containing a urethane acrylate polymer (number average molecular weight: 1,670). To the reaction solution were added 8.1 g of N-vinylpyrrolidone, 9.9 g of isobornyl acrylate, 3.0 g of Irgacure 184 (Ciba Geigy), and 0.3 g of Irganox 1035 (Ciba Geigy), and the mixed solution was stirred. The stirring was continued while controlling the solution temperature at 50–60° C. until the mixed solution changed to a homogeneous and transparent solution, to obtain comparative composition VII containing 67 wt % of a polymer which was the component (A), and 2.9 wt % of a photo-polymerization initiator which was the component (C).

Synthetic Example 8

<Synthesis of urethane acrylate polymer and preparation of comparative composition VIII>

3.3 g of tolylene diisocyanate, 51.0 g of a ring-opening copolymer of butene oxide and ethylene oxide (number average molecular weight: 4,000), 22.6 g of M113 (a polyoxyethylenenonylphenylacrylate), and 0.013 g of 2,6-di-tert-butyl-p-cresol were placed in a reaction vessel equipped with a stirrer, and cooled with ice to below 10° C. When the solution temperature was below 10° C., 0.045 g of dibutyltin dilaurate was added to the mixture, and the mixed solution was stirred for 2 hours while maintaining the solution temperature at 20–30° C. To the mixture was added 0.3 g of SH6062 , followed by stirring at 30–40° C. for 1 hour. After the addition was completed, 1.3 g of hydroxyethyl acrylate was added to the resulting mixture while stirring. The stirring was continued at 50–60° C. for 4 hours. The reaction was terminated when the residual amount of isocyanate was reduced to 0.1 wt % or less, to obtain a reaction solution containing a urethane acrylate polymer (number average molecular weight: 8,750). To the reaction solution were added 3.0 g of N-vinylcaprolactam, 10.1 g of M114 (a monofunctional and reactive diluent produced by Toagosei Co.), 7.1 g of lauryl acrylate, 3.0 g of Irgacure 184, 0.8 g of Irganox 1035, 0.3 g of SEESORB 103 (Sipro Chemical Co.), and 0.1 g of diethylamine. The mixed solution was stirred at 40–50° C. to obtain the comparative composition VIII as a homogeneous and transparent solution. The comparative composition VIII contained 55.4 wt % of a polymer which was the component (A), and 3.0 wt % of a photo-polymerization initiator which was the component (C).

Test Examples

An element wire of optical fiber was prepared by using each of the compositions I–VI and the comparative compositions VII and VIII prepared in the above Examples according to the following method.

Test Example 1

The composition IV was applied to a quartz fiber which was drawn at a draw velocity of 7m/sec, using an optical fiber drawing machine. An ultraviolet light from a metal halide lamp with an output of 3.5 kW (SMX-3500/F-OS made by Oak & Co.,Ltd.) was used to cure the composition VI forming a primary coating layer on the quartz fiber. The composition I was further applied to the cured composition IV, followed by irradiation with ultraviolet light from a 3.5 kW halide lamp to provide a secondary coating layer, thereby obtaining an element wire of optical fiber with a double layered coating.

The element wire of optical fiber thus obtained was evaluted by measuring variations in the diameter of core, the diameter of the primary layer of the composition VI, and the diameter of the secondary layer of the composition I, along a length of 100 m of the element wire, by means of a diameter measuring device using a laser beam (Anritsu Corp.). The results are shown in Table 1.

Test Example 2

A double layered coating element wire of optical fiber was prepared in the same manner as in Test Example 1, except that the composition V and the composition II were used instead of the composition IV and the composition I respectively. The sample thus obtained was evaluated in the same manner as in Test Example 1. The results are shown in Table 1.

Test Example 3

A double layered coating element wire of optical fiber was prepared in the same manner as in Test Example 1, except that the composition VI and the composition III were used instead of the composition IV and the composition I respectively. The sample thus obtained was evaluated in the same manner as in Test Example 1. The results are shown in Table 1.

Comparative Test Example 1

A double layered coating element wire of optical fiber was prepared in the same manner as in Test Example 1, except that the composition VIII and the composition VII were used instead of the composition IV and the composition I respectively. The sample thus obtained was evaluated in the same manner as in Test Example 1. The results are shown in Table 1.

TABLE 1

|  | Test Example I | Test Example II | Test Example III | Comparative Test Comparative I |
|---|---|---|---|---|
| Diameter Core ($\mu$m) | 130 ± 1.0 | 130 ± 0.8 | 130 ± 0.9 | 130 ± 0.9 |
| Primary layer ($\mu$m) | 172 ± 2.0 | 170 ± 1.8 | 169 ± 1.7 | 165 ± 15 |
| Secondary layer ($\mu$m) | 250 ± 2.1 | 248 ± 2.0 | 249 ± 2.0 | 250 ± 22 |

Test Example 4

A 20-meter strip was cut from each element wire of optical fiber prepared in the above Test Examples and Comparative Test Example as a test sample and the weight (W1) of test sample was accurately measured. The test sample was extracted with methyl ethyl ketone for 12 hours, using a Soxhlet's extractor and then vacuum-dried. The weight (W2) of the residual coating substance and quartz core was measured.

The weighed test sample made of the above residual coating substance and quartz core was heated at 800° C. for 4 hours in a furnace so that all but the quartz core was burnt to ashes. The weight (W3) of residual quarts core was measured.

Using the weight (W1, W2, W3) measured above, a methyl ethyl ketone-extraction coefficient (MEKC) was calculated according to the following formula.

MEKC (%)=(W1−W2)/(W1−W3)×100

The results are shown in Table 2.

TABLE 2

|  | Test Examples | | | Comparative Test Examples |
|---|---|---|---|---|
|  | 1 | 2 | 3 | 1 |
| Extraction coefficient (%) | 6.5 | 6.3 | 7.0 | 10.1 |

Test Example 5

Each of the compositions I–VI and the comparative compositions VII, VII was irradiated with ultraviolet light at a dose of 1 J/cm² from a metal halide lamp (SMX-3500/F-OS manufactured by Oak & Co., Ltd.) in a nitrogen atmosphere, to obtain an ultraviolet light cured resin.

About 1 g of the cured resin thus obtained was inserted into a glass ampoule of 1 cm diameter and accurately weighed. After the glass ampoule was tightly sealed, the glass ampoule containing the cured resin was allowed to stand in a thermal chamber at 100° for 7 days. The glass ampoule was then placed in a glass vial capable of being tightly closed and the ampoule was broken while in the glass vial which was tightly closed. A gas sample was extracted from the vial and the hydrogen gas content of the gas sample was quantitatively measured by means of a gas chromatograph. The results are shown in Table 3.

TABLE 3

|  | Hydrogen gas generation ($\mu$l/g) |
|---|---|
| Composition I | 1.0 |
| Composition II | 2.2 |
| Composition III | 1.8 |
| Composition IV | 0.6 |
| Composition V | 0.8 |
| Composition VI | 0.7 |
| Comparative composition VII | 6.8 |
| Comparative composition VIII | 8.2 |

The composition of the present invention has optimum fluidity so that a uniform film can be formed even when the material is drawn at a high speed. Accordingly, the composition of the present invention has excellent coating characteristics as a coating material for optical fiber.

The composition of the present invention also exhibits such high curability that the productivity of optical fiber can be increased when the composition is used as a coating material for optical fiber. Further, the composition of the present invention generates little hydrogen gas after it is cured. As a result, the composition of the present invention has excellent characteristics as a coating material for optical fiber.

We claim:

1. A liquid photocurable optical fiber coating composition comprising
    (A) 10–75 wt. % of an urethane oligomer containing an ethylenically unsaturated group
    (B) 5–50 wt. % of at least one monomer selected from the group containing an ethylenically unsaturated group having the following formula (6),

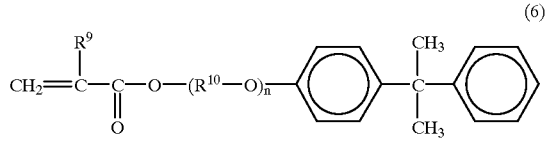

(6)

wherein $R^9$ is a hydrogen atom or a methyl group, $R^{10}$ is an alkylene group having 2–4 carbon atoms, and n denotes an integer from 1–10,
    (C) 0.1–10% by weight of a photopolymerization initiator,
and optionally other compounds comprising one or more ethylenically unsaturated groups.

2. Resin composition according to claim 1 wherein the urethane oligomers contain least one structural unit selected from the following groups (1)–(4),

(1)

wherein $R^1$ is an alkylene group having 2–6 carbon atoms,

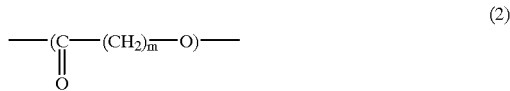

(2)

wherein m denotes an integer from 3–10,

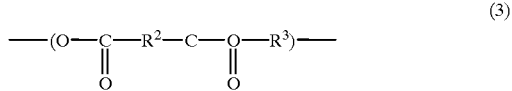

(3)

wherein $R^2$ and R3 individually represent a divalent organic group having 2–13 carbon atoms,

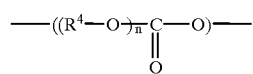

(4)

wherein n is an integer from 1–50 and $R^4$ is an alkylene group having 2–6 carbon atoms or a divalent organic group of the following formula (5),

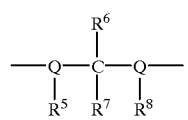

(5)

and wherein $R^5$, $R^6$, $R^7$, and $R^8$ individually represent a hydrogen atom or an alkyl group having 1–8 carbon atoms, and Q denotes a phenyl of hydrogenated phenyl group.

3. The liquid photocurable resin composition according to claim 1, wherein the component (A) is a urethane (meth) acrylate.

4. The liquid photocurable resin composition according to claim 1, wherein the component (B) is a monomer as shown in the formula (6) in which n is an integer from 1–5.

5. The liquid photocurable resin composition according to claim 1, wherein the total amount of component (A) and component (B) exceeds 30% by weight.

6. The liquid photocurable resin composition according to claim 1, further comprising 1–60% by weight of at least one compound selected from the following compounds (D) and (E):
    (D) A monofunctional compound having one ethylenically unsaturated group in the molecule, other than the component (B).
    (E) A polyfunctional compound having two or more of ethylenically unsaturated groups in the molecule.

7. Optical glass fiber coated with at least one cured coating, the uncured coating being a composition according to any one of claims 1–6.

8. Ribbon assembly comprising a plurality of coated optical glass fibers, bonded together with a matrix materal, the uncured matrix material being a composition according to any one of claims 1–6.

* * * * *